Aug. 27, 1963  K. P. BELLINGER  3,102,011
TUMBLING CHIPS
Filed Dec. 21, 1959

INVENTOR.
KENNETH P. BELLINGER
BY
*Lindsey and Prutzman*
ATTORNEYS

United States Patent Office 3,102,011
Patented Aug. 27, 1963

3,102,011
TUMBLING CHIPS
Kenneth P. Bellinger, Ellington, Conn., assignor to Conversion Chemical Corporation, Rockville, Conn., a corporation of Connecticut
Filed Dec. 21, 1959, Ser. No. 860,967
7 Claims. (Cl. 51—298)

This invention relates to an improved method of manufacturing tumbling chips, and to improved chips particularly adapted for barrel finishing of metal parts or for lapidary use generally.

This application is a continuation-in-part of my copending application Serial No. 738,276, filed May 28, 1958, and now abandoned.

A primary object is to provide an improved method for the production of a tumbling chip with high inherent resistance to crumbling or decomposure during use.

An important object is to provide a very light weight tumbling chip which readily floats through a tumbling barrel during use while retaining its shape and abrasive characteristics during a very long life span.

A further object is to provide an improved tumbling chip which combines long life with self-cleaning properties, thus accelerating the cutting action by continuously presenting clean cutting surfaces to the material or object subjected to tumbling treatment.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
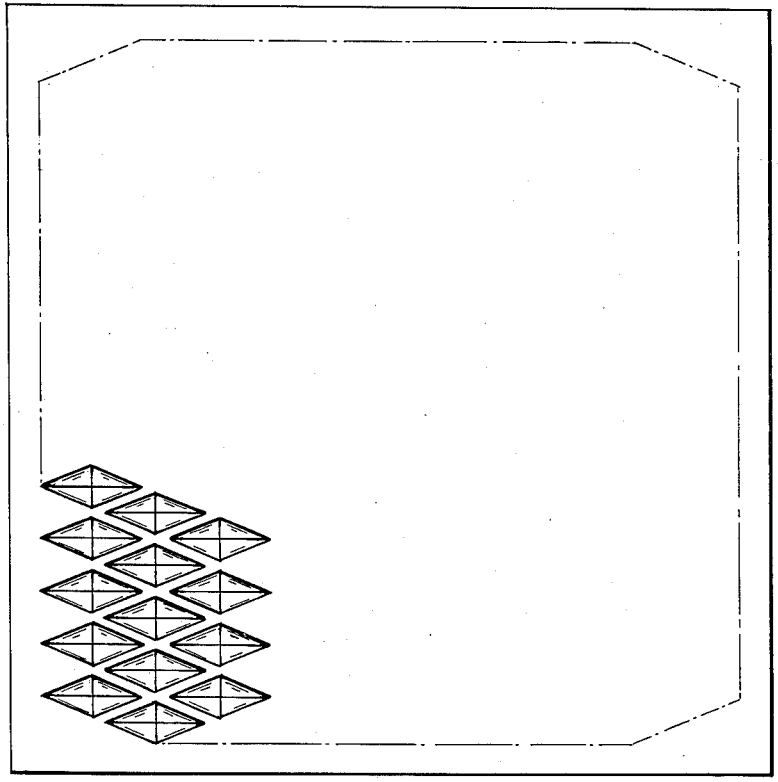
FIG. 1 is a plan view of an exemplary mold for making tumbling chips of the present invention.

It has now been found that tumbling chips of improved ruggedness, superior abrasive action, and greatly increased life, together with lightness in weight, are obtained by the use of a chip containing essentially abrasive particles and glass fibers bonded together by a thermosetting plastic resin. The percentage of abrasive material to resin and the percentage of glass fibers is controlled within limits hereinafter disclosed and variable within these limits to alter the cutting and wear characteristics desired.

It has further been found that tumbling chips of the aforementioned essential composition may be prepared by a method in which the abrasive particles are thoroughly admixed with the thermosetting resin, after which the glass fibers are added to the mix and agitated therewith sufficiently to insure thorough distribution without excessive fracturing. The mix as thus prepared has a semifluid, gel-like consistency and is transferred into molds of suitable configuration for casting into chips of the desired configuration and size, as will hereinafter be more fully described.

The tumbling chips of the present invention contain essentially 40–70 percent by weight of abrasive, 20–55 percent by weight of thermosetting resin, and 1.5–15 percent by weight of glass fibers. As previously stated, the amounts of the various components may be varied in accordance with the characteristics desired. A preferred chip composition is one containing 45–60 percent by weight of abrasive, 35–50 percent by weight of resin and 2–8 percent by weight of glass fibers.

Any of the commonly employed abrasives may be used for the tumbling chips of the present invention, including aluminum oxide, silicon dioxide, Carborundum, tungsten carbide, silicon carbide, emery dust, diamond dust, and even the softer abrasives such as limestone and similar materials. The particular abrasive selected will depend upon the nature of the abrasive action and the characteristics desired in the tumbling chip. It is important, regardless of the particular abrasive used, that it be of fairly even particle size, whether granulated or finely comminuted, to provide uniform abrasive surfaces on the chip surface during the life of the chip, regardless of the extent of wear during long use.

The percentage of abrasive material to resin is dictated in part by the particular cutting characteristics desired and also by the size of the abrasive particles employed. It has been found that both cutting efficiency (rapidity of cut) and the wear factor increase substantially linearly as a function of the percentage of the abrasive in the mix. Furthermore, greater amounts of abrasive particles may be employed in the mix when the abrasive particles are of finer size.

The glass fibers and abrasive particles are bonded together by the thermosetting resin, which may be any thermosetting resin having the characteristics of high tensile, flexural and hot strength properties to withstand tumbling action and which are substantially resistant to the acids that may be present in the tumbling barrel. Among those resins which may be employed are the polyesters, both rigid and flexible, the phenolics, and various epoxy resins. The selection of the particular resin will be largely determined by the ultimate characteristics desired, cost and ease of handling. In practice, the polyesters have proven particularly advantageous.

Generally, the glass fibers employed in the present invention may be provided by commercially available mats of random length. The fibers should be predominantly of a length of 1/8–2 inches, and preferably about 1/2–1 1/4 inches. It has been found that fibers of excessive length are broken off from the main body of the chip during the molding operation and so do not present any particular problem while presenting a highly desirable characteristic of increased structural strength.

The chips so produced do not glaze because the binder is soft in comparison to the abrasive. The resin tenaciously retains the imbedded abrasive particles, and any abrasive materials created during the tumbling operation, such as metal particles, or dislodged abrasive grains, wear down the resin before dislodging the abrasive particles, thus providing a self-cleaning action to the chip. The glass fibers in the chip provide high structural bonding throughout the chip, thus enabling it to be cast into elongated shapes with tapered end portions, heretofore generally not feasible.

In the practice of the present invention, the thermosetting resin is admixed thoroughly with the abrasive particles, when the resin has reached a semi-fluid state prior to hardening. In this manner, the particles may be uniformly distributed and suspended in the resin, and then the glass fibers are added to the mix and quickly distributed therein. The addition of the glass fibers renders the mix quite viscous and almost dough-like in consistency so that it is preferable that the resin be relatively fluid prior to the addition thereof. The agitation period following the addition of the glass fibers should be as short as possible to maintain sufficient fluidity in the mix for satisfactory molding.

The addition of gelling or thixotropic substances is often desirable to hold the abrasive particles and glass fibers in suspension during the mixing operation. Various substances may be employed, and float filler Micro-Cel (brand of calcium silicate) has proven particularly beneficial for this purpose, 1–10 percent by weight being sufficient.

The addition of high temperature catalysts such as benzoyl perozide or cumene hydroperoxide in a percentage range of about 0.5–1.0 percent by weight is generally desirable since the catalyst becomes effective at a temperature above about 190° F. to promote full setting of the resin during the molding operation. A further desirable additive to the mix may be a minor percentage of a dye, so that the various grades of tumbling chips so-produced may be readily distinguished.

Subsequent to admixing the composition, the now-semifluid mix is transferred to suitable molds for casting into the desired shape, preferably by pressure molding at an elevated temperature. By maintaining the mix in a sufficiently fluid condition, distribution may be easily made iwth a minimum of entrapment of air.

Conveniently, waffle-like molds of the type illustrated in FIG. 1 of the attached drawing may be employed. An excess of the mix is placed upon the lower mold, and a mating mold is then brought down thereupon, and the pressure forces the mix into the mold cavities. The casting conditions will vary with the characteristics of the particular resin selected.

Figure 2:
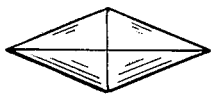
FIG. 2 is a plan view of a tumbling chip produced in accordance with the present invention in the mold of FIG. 1.
Figure 3:
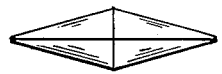
FIG. 3 is a side elevational view thereof.

The elongated octahedronal tumbling chip illustrated in FIGS. 2 and 3 is representative of the highly desirable type which may be made in accordance with the present invention. The elongated tail portions or tapered end portions are most desirable for reaming out holes and doing similar abrading operations without getting stuck or breaking.

Indicative of the compositions and method of the present invention are the following examples.

*Example 1*

To 68 pounds of Isolite 993 (a polyester resin containing monomeric styrene and isophthalic anhydride) and 1.36 pounds of Luperco ATC Catalyst (a composition containing 50 percent benzoyl peroxide in tricresylphosphate) were added 68 pounds of 120 mesh aluminum oxide abrasive and 4.08 pounds of Micro-Cel (brand of calcium silicate). This composition was thoroughly admixed in a batter beater, and then 4.5 pounds of glass fiber mat of approximately 1½ inches in length was added thereto. This mixture was agitated to insure thorough blending, and then the semi-fluid, gel-like mix was transferred to cast iron molds of the type illustrated in the attached drawing. The composition was molded at 235° F. at 100 p.s.i., the cure time being 40 seconds. The chip so-produced was substantially octahedronal in shape, having a longitudinal dimension of 1⅝ inches and a horizontal dimension of ⅝ inch, the thickness being approximately ½ inch. The chips so-produced had a density of 1.86 grams per cc.

*Example 2*

To 10.5 pounds of Laminac 4128 (a polyester resin) and 3.4 ounces of Luperco ATC Catalyst (a composition containing 50 percent benzoyl peroxide in tricresylphosphate) were added 13.5 pounds of an 80 mesh mixture of equal parts of aluminum oxide and silicon carbide. These components were thoroughly mixed in a Baker-Perkins dough mixer and then 4.0 pounds of glass fiber of approximately 1½ inches in length was added thereto. The mixture was agitated to insure thorough blending, and then the almost dough-like mix was transferred to cast iron molds and molded in accordance with the procedure described in Example 1 into octahedronal chips ½ inch wide and 1 inch long. The density of the chips was 1.8 grams per cc.

I claim:

1. A solid molded lightweight tumbling chip consisting essentially of 40–70 percent by weight of abrasive material, 1.5–15.0 percent by weight of glass fibers and 20–55 percent by weight of thermosetting resin, said fibers and abrasive material being substantially uniformly dispersed throughout said tumbling chip and bonded by said thermosetting resin, and said chip being of elongated configuration with a tapered end portion adapted to enter into apertures in a workpiece and being characterized by presenting uniform, substantially smooth abrasive surfaces during the working life thereof.

2. A solid molded lightweight tumbling chip consisting essentially of 45–60 percent by weight of abrasive material, 2–8 percent by weight of glass fibers and 30–55 percent by weight of thermosetting polyester resin, said fibers and abrasive material being substantially uniformly dispersed throughout said tumbling chip and bonded by said thermosetting polyester resin, and said chip being characterized by presenting uniform substantially smooth abrasive surfaces during the working life thereof and having an elongated configuration with tapered end portions adapted to enter into apertures in a workpiece.

3. A tumbling chip in accordance with claim 2 wherein said chip is of elongated octahedronal configuration provided by a pair of tetrahedronal portions extending from the center thereof.

4. A solid molded lightweight tumbling chip consisting essentially of 40–70 percent by weight of abrasive material, 1.5–15.0 percent by weight of glass fibers and 20–55 percent by weight of thermosetting resin, said glass fibers and abrasive material being uniformly distributed throughout and bonded by said resin to present uniform substantially smooth abrasive surfaces on said chip during use thereof, said chip being of elongated configuration and having a body portion of major cross section intermediate its length and end portions tapering from said body portion towards a point to provide reduced cross-sectional surfaces adapted to penetrate into apertures in a workpiece.

5. The method of producing a solid molded lightweight abrasive tumbling chip comprising mechanically blending a mixture consisting essentially of 20–55 percent by weight thermosetting resin, 40–70 percent by weight of abrasive material and 1.5–15.0 percent by weight of glass fibers to a gel-like consistency; transferring said blended mixture into a mold defining a cavity with a tapered end portion and subjecting said mixture to pressure and heat sufficient to set the resin and form a chip in said mold having a tapered end portion adapted to penetrate into apertures in a workpiece and uniform, substantially smooth working surfaces.

6. The method of producing a solid molded lightweight abrasive tumbling chip comprising mechanically blending a thermosetting resin and abrasive material into a semi-fluid mass, mechanically blending glass fibers into said semi-fluid mass to form a substantially homogeneous mixture, the composition of said homogeneous mixture consisting essentially of 20–55 percent by weight thermosetting resin, 40–70 percent by weight of abrasive material and 1.5–15.0 percent by weight of glass fibers; transferring said mixture into a mold defining an elongated cavity having tapered end portions; and subjecting said mixture to pressure and heat sufficient to set the resin and form a chip in said mold having tapered end portions adapted to penetrate into apertures in a workpiece and uniform, substantially smooth working surfaces.

7. The method of producing a solid molded lightweight abrasive tumbling chip comprising mechanically blending a thermosetting polyester resin and abrasive material into a semi-fluid mass, mechanically blending glass fibers into said semi-fluid mass to form a substantially homogeneous mixture, the composition of said homogeneous mixture consisting essentially of 30–50 percent by weight thermosetting polyester resin, 45–60 percent by weight of abrasive material and 2–8 percent by weight of glass fibers; transferring said mixture into a mold defining an elongated cavity having a major cross-section intermediate its length and having end portions tapering from said major cross section towards a point; and subjecting said mixture to pressure and heat sufficient to set the resin and form a chip in said mold having tapered end portions adapted to penetrate into aperture in a workpiece and uniform, substantially smooth working surfaces.

References Cited in the file of this patent

UNITED STATES PATENTS

| | | |
|---|---|---|
| 1,900,386 | Kuzmick | Mar. 7, 1933 |
| 2,280,242 | Kropa | Apr. 21, 1942 |
| 2,711,365 | Prince et al. | June 21, 1955 |
| 2,763,105 | Feeley | Sept. 18, 1956 |
| 2,800,403 | Bosler et al. | July 23, 1957 |
| 2,862,806 | Nestor | Dec. 2, 1958 |
| 2,885,276 | Upton | May 5, 1958 |
| 2,947,124 | Madigan et al. | Aug. 2, 1960 |
| 2,978,850 | Gleszer | Apr. 11, 1961 |

FOREIGN PATENTS

| | | |
|---|---|---|
| 749,748 | Great Britain | May 30, 1956 |